Figure 1:
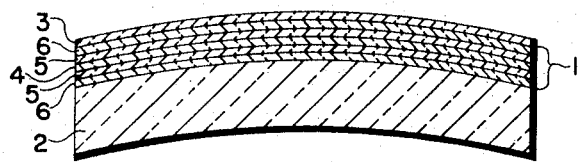

United States Patent [19]
Schuler

[11] 3,833,289
[45] Sept. 3, 1974

[54] COMPOSITE LIGHT-POLARIZING ELEMENT

[75] Inventor: Norman W. Schuler, Lexington, Mass.

[73] Assignee: Polaroid Corporation, Cambridge, Mass.

[22] Filed: May 2, 1972

[21] Appl. No.: 249,651

Related U.S. Application Data

[60] Continuation-in-part of Ser. No. 41,504, May 28, 1970, abandoned, which is a division of Ser. No. 726,141, May 2, 1968, abandoned.

[52] U.S. Cl................ 350/155, 264/2, 350/166, 350/175 NG, 351/166
[51] Int. Cl................... G02b 1/08, G02c 7/12
[58] Field of Search............ 350/155, 175 NG, 234; 351/162, 163, 155, 177, 166; 264/1

[56] References Cited
UNITED STATES PATENTS

| | | | |
|---|---|---|---|
| 2,320,375 | 6/1943 | Moulton | 350/155 |
| 2,527,400 | 10/1950 | Cooper | 350/155 |
| 3,097,106 | 7/1963 | Blout et al. | 351/162 X |
| 3,171,869 | 3/1965 | Weinberg | 351/163 UX |
| 3,211,811 | 10/1965 | Lanman | 351/177 UX |
| 3,560,076 | 2/1971 | Ceppi | 350/155 |
| 3,620,888 | 9/1966 | Buzzell | 350/155 X |
| 3,673,055 | 6/1972 | Sheld | 351/166 UX |

*Primary Examiner*—John K. Corbin
*Attorney, Agent, or Firm*—Sheldon W. Rothstein

[57] ABSTRACT

A composite light-polarizing lens comprising a light-polarizing element having coated on each surface thereof a layer which enhances adhesion between in situ formed lens components and inhibits migration of lens constituents between said light-polarizing elements and said in situ polymerized components during formation of said lens.

9 Claims, 2 Drawing Figures

COMPOSITE LIGHT-POLARIZING ELEMENT

This application is a continuation-in-part of copending application Ser. No. 41,504, filed May 28, 1970, now abandoned, which, in turn, is a division of application Ser. No. 726,141, filed May 2, 1968, now abandoned, both in the name of Norman W. Schuler.

The present invention is particularly directed toward composite light-polarizing synthetic plastic ethical lenses of the type disclosed in copending application Ser. No. 41,504, also assigned to Polaroid Corporation. Such lenses are generally adapted to be utilized in providing substantially any given ophthalmic lens prescription to accommodate the eyes of a prospective user and facilitate a correction to such user's vision, while at the same time providing to such user the benefits which may only be achieved by employing a light-polarizing material.

It will be apparent that many advantages may be achieved by utilizing a tough, optical quality plastic material for ophthalmic lenses in lieu of glass. Plastics are more highly resistant to fracture than glass, do not require extremely high temperatures to produce a desired lens, and do not generally require the expensive grinding and polishing operations which must be carried out, in most cases, before a glass lens is completed. Until the advent of modern transparent optical quality synthetic plastic materials, it was highly undesirable to form lenses from synthetic plastics since most of the available plastics were soft and therefore susceptible to severe abrasion. In addition, in those instances where tough, thermosetting resins were utilized for lens manufacture, such resins were difficult to handle in the thicknesses required for ophthalmic lenses. Until the development of the lenses described in the aforenoted copending application, people requiring corrective lenses to restore and/or aid their vision were denied the benefits of light-polarizing lenses which were made entirely of synthetic plastic materials. The few light-polarizing ethical lenses available comprised glass elements between which a light-polarizing member was interposed. However, this obviously did not eliminate any of the problems inherent in glass lenses and, due to the difficulties encountered in the manufacture of such lenses and the extremely high incidence of rejects, such lenses were inordinately expensive.

As has been claimed in the above-denoted copending application, the method of manufacturing synthetic plastic ophthalmic lenses generally comprises the injection of a synthetic plastic monomeric material immediately adjacent each side of a light-polarizing element secured into a mold. The respective curvatures of the surfaces of the ultimately produced lens are, of course, governed by the shapes of the surfaces of the mold elements adjacent each respective surface of the light-polarizing element and offset therefrom a predetermined distance. Since, as will be appreciated from the discussion hereinbelow, plastic ophthalmic lenses are generally ground to a given prescription by grinding only the rear or concave surface of the lens, the light-polarizing element should be offset toward the convex side of the lens as much as possible thereby providing a substantially thicker concave in situ polymerized component than the convex in situ polymerized component. According to the disclosure in copending application Ser. No. 249,550, filed May 2, 1972, now abandoned, also assigned to Polaroid Corporation, this may be facilitated by securing into a resilient mold component a light-polarizing element which has been provided with projections about its periphery to provide such predetermined distance between at least one face of the light-polarizing element and its complementary mold component.

It has been found that, in accordance with the method for manufacturing synthetic plastic composite light-polarizing lenses disclosed and claimed in above-denoted copending application Ser. No. 41,504, under certain circumstances catalyst utilized with monomeric materials required to form outer lens components of the lenses disclosed therein often migrates from the monomeric materials in which they are contained into the light-polarizing element which forms an integral component of the ultimate lens thereby deleteriously affecting the light-polarizing element by bleaching dyes comprising the element. In addition, plasticizer components of the light-polarizing element were sometimes found to migrate therefrom into polymerizing monomer which causes the formation of a "soft" polymeric material generally containing striations and haze; and monomer sometimes migrated into the light-polarizing element and caused it to deform and buckle. By the instant invention, a combination tiecoat-barrier layer is provided which obviates the migration effect of catalysts, monomeric materials, and plasticizers which are employed in forming the composite lenses of the present invention and insures adequate adhesion between the components of the composite structure.

It is accordingly an object of the present invention to provide light-polarizing composite ophthalmic lenses which comprise synthetic plastic materials.

It is another object of the present invention to provide a composite synthetic plastic light-polarizing lens which includes tiecoat-barrier layers which prevent migration of plasticizer, catalyst, and monomer materials from given lens components to other lens components.

It is a further object of the present invention to provide a process for the production of light-polarizing ophthalmic lenses which is economical, has a low incidence of rejects and obviates the migration problems heretofore encountered which caused a substantial incidence of rejects.

The invention accordingly comprises the process involving the several steps and the relation of one or more of such steps with respect to each of the others and the product possessing the features, properties and relation of elements which are exemplified in the following detailed disclosure and the scope of the application which will be indicated in the claims.

Figure 2:
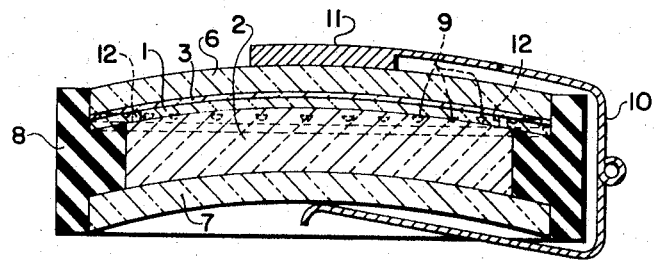

For a fuller understanding of the nature and objects of the invention, reference should be had to the following detailed description, taken in connection with the accompanying drawing wherein:

FIG. 1 is a side, cross-sectional view of the composite light-polarizing lens element of the present invention; and FIG. 2 is a side cross-sectional view of the lens of the present invention being formed in a suitable mold.

Stated generally, the present invention contemplates the casting of plastic lenses in mold cavities formed, preferably, between rigid and flexible mold components, said flexible mold components being preferably cylindrical. More specifically, the invention contemplates the interposition of a shaped light-polarizing synthetic plastic member between layers of an optical quality synthetic monomeric material in a mold comprising resilient and rigid components; and heating the material and mold thereby causing in situ polymerization of said monomeric material with the concomitant formation of a composite synthetic plastic light-polarizing lens structure — it being a principal feature of the invention that the light-polarizing element have a coating on each of its surfaces which performs the functions of insuring a suitable bond between the light-polarizing element and adjacent in situ formed lens components and inhibiting plasticizer migration from the light-polarizing element into the monomeric materials injected adjacent thereto, while, at the same time, preventing monomer, and catalyst contained in the monomer, from migrating into layers comprising the light-polarizing element.

The principal lens produced by the present invention is prepared according to the procedure generally described above, which will be more fully discussed below, and is supplied to optical laboratories, usually in a semi-finished form, for distribution. Due to limitations in modern grinding and polishing equipment for plastics, the front, or convex surface of the lens is preferably cast into its finished configuration at the time of manufacture, its surface requiring no grinding or polishing. The concave surface, however, is preferably formed in a variety of diopters which encompass a range of plus and minus corrections. Any given particular prescription may be prepared by selecting a lens with cast-in optics close to the prescribed dimensions, followed by grinding and polishing the concave surface according to the exact prescription required. It will be evident that in certain instances the configuration of the lens will conform to the desired prescription without further grinding or polishing.

As is well known in the lens casting art, as polymerization occurs, the lens material shrinks a certain degree, thereby, in many instances, causing the lens surfaces to conform to a shape different from that of the mold surfaces. There are numerous well-known techniques available to the operator to provide a hedge against this phenomenon. The preferred technique is to construct the body of the mold of a resilient material, and preferably a vinyl material which will shrink in conjunction with the shrinkage inherent in the polymerization process, thus assuring substantial conformity of the ultimate configuration produced on each of the lens surfaces with the surface of the rigid mold element with which it is intimate.

Any suitable polymeric light-polarizing sheet material which will produce the desired light-polarization effect may be utilized in the context of the present invention. However, the preferred material is a transparent sheet of polyvinyl alcohol containing substantially oriented molecules of dehydrated polyvinyl alcohol and deriving its light-polarizing properties essentially from the dehydrated molecules. The manufacture and utilization of such sheet material may be appreciated with reference to U.S. Pat. Nos. 2,173,304; 2,255,940; 2,306,108; 2,445,555; 2,453,186; and 2,674,159 all incorporated herein by reference. Among other materials which may be utilized as light-polarizing elements in the present invention are, for example, polyvinyl butyral and polyvinyl alcohol, used in conjunction with a dichroic stain.

In a preferred embodiment of the present invention, the light-polarizing material is sandwiched between relatively thin layers of an optical quality transparent polymeric material which serves to support said light-polarizing material. Among the materials which may be utilized for this purpose are cellulose acetate butyrate, methyl methacrylate, cellulose acetate, cellulose triacetate, etc. Cellulose acetate butyrate is preferred. The bond between the light-polarizing element and the polymeric support material may be accomplished, for example, according to the methods of Buzzell and Bloom, U.S. Pat. Nos. 3,620,888 and 3,588,216, respectively, both incorporated herein by reference. It will be appreciated from a reading of the above patents that lamination of a cellulose acetate butyrate support material to a typical polarizing sheet as, for example, one comprising polyvinyl alcohol, may be accomplished either by subcoating the cellulose acetate butyrate material with a suitable compound such as, for example, cellulose nitrate, and then laminating the subcoated material to the polyvinyl alcohol light-polarizing sheet using a well-known pressure roll technique with a typical adhesive for such materials such as, for example, a 2 percent polyvinyl alcohol solution, or alternatively, the lamination may be accomplished by the conversion of the surface of the cellulose acetate butyrate to cellulose, subcoating the surface with polyvinyl alcohol, and pressure laminating the subcoated cellulose acetate butyrate to the light-polarizing material, as more fully disclosed in the Buzzell patent mentioned above.

In the most preferred embodiment of the present invention, the tiecoat-barrier layers employed to prevent the migration of various materials from the light-polarizing element to adjacent injected monomeric components, and concomitantly from such monomeric components to the light-polarizing element, are preferably coated onto, for example, the cellulose acetate butyrate polymeric support material for the light-polarizing element on the surface thereof opposed to its surface which is laminated directly to the light-polarizing element. This may be accomplished prior to lamination of such material to the light-polarizing element by employing, for example, a conventional slot coater which provides a film of a thickness between two and twenty microns. While numerous materials may be obvious to those of ordinary skill in the art which will provide the denoted functionality in the context of the present invention, the materials utilized will preferably contain nitrocellulose having a viscosity measured by ASTMD301-56 of higher than 600 sec. and preferably higher than 2500 sec. and having a nitrogen content of about 12 percent. The coating material should preferably contain more than 20 percent nitrocellulose based upon the weight of the total resins in the coating material. While the barrier-tiecoat of the present invention may comprise 100 percent nitrocellulose, which preferably contains a crosslinking agent, as, for example, an organic titanate, it will preferably comprise at least one other resinous material which contributes a high degree of impenetrability by the components present during the formation of the lenses of the present invention. Among such materials are, for example, phenolics, e.g., melamine formaldehyde, urea formaldehyde, phenol formaldehyde; polyhalogenated vinyls, e.g., polyvinyl chloride, polyvinylidene chloride; polyvinyl esters and acetals, e.g., polyvinyl acetate, polyvinyl butyrate; polyamides, e.g., soluble nylons; polyacrylates, e.g., polyacrylonitrile, polyethylene glycol dimethacrylate; soluble poly ester resins; epoxy resins; etc. The preferred material for use in the context of the present invention is a melamine formaldehyde resinous material.

The light-polarizing element employed in fabricating the composite lenses of the present invention is preferably preformed to adequately conform to the respective configurations of the plastic elements which are to be polymerized on either side thereof. Accordingly, it will be apparent that the more extreme configurations in the convex and concave elements will require concomitant deviations in the shape of the light-polarizing element from the planar configuration. In addition, in order to avoid light refraction problems the curvature of the light-polarizing element should be approximately the same as the curvature of the convex surface of the lens. In order to prevent injuring the light-polarizing element during grinding and polishing of the concave surface, the light-polarizing element should be situated reasonably close to the convex surface of the lens. Preforming of the light-polarizing element is preferably accomplished by a conventional pressing operation.

During the preforming of the light-polarizing insert, it will be appreciated that various diopters of curvature may be employed and, as denoted, such curvatures will generally conform to the desired curvature that the outer or generally convex surface of the ultimate lens will follow.

In actual operation, a suitable catalyst is dissolved in the monomeric material from which the outer layers of the desired lens are to be manufactured. The mold, as depicted in FIG. 1. is preferably constructed with outer rigid mold elements, preferably comprising glass, the front element being seated against raised means depending from a light-polarizing member which has coated on each face thereof a barrier-tiecoat as discussed hereinabove, and is secured in place by a resilient body element constructed, for example, of rubber. The resilient mold element is preferably cylindrical; however, within the context of the present invention it may assume any desired transverse cross-sectional configuration, as, for example, rectangular, square, elliptical, etc. Using a suitable syringe, monomer with catalyst incorporated therein is injected through the resilient area into the mold on one or both sides of the light-polarizing element, and the entire structure is then heated for a sufficient time to cause the material to polymerize. Any optical quality synthetic plastic material may be utilized for the outer members of the lenses of the instant invention provided, however, that its ultimate second order transition temperature is above the highest temperature at which the lenses may be utilized; as, for example, in the average usage of ophthalmic lenses, 130° F. Exemplary monomeric materials are 1,3-butylene glycol dimethacrylate, acrylonitrile, allyl methacrylate, trimethylol propane triacrylate, cyanoethyl methacrylate, bis phenyl A dimethacrylate, methoxybutyl methacrylate, methyl methacrylate, diethylene glycol bisallyl carbonate, ethoxymethyl methacrylate, ethylene glycol dimethacrylate, ethylene glycol diacrylate, polyethylene glycol dimethacrylate, etc. The preferred material is diethylene glycol bisallyl carbonate.

Monomeric materials, such as those enumerated in the paragraph next above, may be formed into homopolymers or, alternatively, copolymerized with materials which increase their hardness, heat resistance, etc. Among such materials which may be copolymerized with the above-mentioned exemplary monomers are vinyl acetate, maleic anhydride, ethylene glycol maleate, triallyl cyanurate, diallyl phthalate, etc.

In the event the monomer is injected on only one side of the secured light-polarizing element, the light-polarizing element will be preferably provided with, close to its periphery, one or more holes in order to facilitate transfer of monomeric material from the cavity into which it has been injected into the opposed cavity. Since, as has been aforenoted, the concave area of the lens will comprise a substantially thicker polymerized section, the polymer will preferably be injected into that cavity and will flow therefrom into the convex area. Accurate amounts of material for injection may be determined by simple volumetric computations. In addition, suitable air escape ports may be provided in conventional manner.

Since thermosetting materials are, as a rule, far more abrasion resistant than thermoplastic materials, they are preferred for use in the present invention. It has been found that when diethylene glycol bisallyl carbonate, the preferred material, is utilized, a cure time of about eight to sixteen hours is required before the lens is completely formed.

Any catalyst compatible with the chosen monomeric material utilized in the present invention may be employed. Examples of suitable catalysts are diisopropyl percarbonate, benzoyl peroxide, azobisisobutyronitrile, methylethyl ketone peroxide, di-s-butyl percarbonate, etc. In the preferred systems of the present invention, di-s-butyl percarbonate has been found to give extremely fine results when utilized in proportions of approximately 2.5 to 4.5 percent based upon the weight of the monomer.

In order to provide a desired color to the lenses of the present invention, various dyes may be incorporated therein either by being absorbed on the surface of the outer polymeric material by being integral with the initial monomeric charge, or by being imbibed or cast into the plastic support members for the light-polarizing material. In addition, other agents such as ultraviolet radiation absorbers, infrared radiation absorbers, visible light attenuation dyes, etc., may be added to the system to provide additional benefits.

Referring to FIG. 1 of the drawing, there is illustrated a cut-away view of a typical lens structure of the present invention. Elements 2 and 3 with concave and convex external surfaces, respectively, comprise polymeric material which has been polymerized in situ in contact with preformed light-polarizing element composite structure 1 which comprises light-polarizing element 4, transparent plastic elements 5 which act as supports for element 4 and thin coatings of tiecoat-barrier material 6.

Referring now to FIG. 2, elements 1, 2 and 3 are depicted in mold 11 which is composed of a resilient body component 8 and rigid elements 6 and 7. Rigid element 6 which will provide the convex surface to the ultimately produced lens is in direct contact with projections 9 provided according to application Ser. No. 249,550, filed May 2, 1972. The assembled mold is securely held together by clamp element 10; however, it should be understood that any suitable means of holding the mold together such as, for example, integral resilient element lip members, etc., may be utilized. The resinous material injected between the light-polarizing composite element 1 and elements 6 and 7, respectively, may be inserted into the mold in any known manner, but preferably by injection into the concave cavity through the resilient mold member with consequent transfer of monomeric material to the convex cavity by means of suitable monomer transfer ports 12 which provides communication between the respective convex and concave cavities of the assembled mold-light-polarizing structure. While the resilient portion of the mold may generally comprise any elastomeric material, it is preferred to employ a resilient mold member comprising polyvinyl chloride plasticized with dioctyl phthalate in conventional manner. See, for example, the disclosure in U.S. application Ser. No. 249,549, filed May 2, 1972, now abandoned, also assigned to Polaroid Corporation.

The plastic lenses of the present invention may be produced in a blank, or unfinished form, and may subsequently be ground and polished, if necessary, using the same technology and major equipment utilized on crown glass. However, as has been alluded to above, in the event that grinding and polishing is performed, the operations will preferably be carried out on the concave surface of the lens, since, in the preferred embodiments, nearly the full range of possible prescriptions will have been cast into the convex surfaces of lenses from which the operator may choose. It is estimated that in order to fully accomplish this goal, between four and five hundred different convex configurations will be utilized in producing a full range of lenses for ophthalmic use. While the primary purpose of the present invention is to provide ethical ophthalmic lenses, it will, of course, be appreciated that lenses cast in a planar configuration for use without alteration is anticipated herein.

The following example illustrates the preparation of a typical lens of the instant invention and is to be considered illustrative only and not taken in a limiting sense.

EXAMPLE

A sheet of a light-polarizing material comprising partially hydrolyzed polyvinyl alcohol, each face of which has bonded thereto a layer of cellulose acetate butyrate approximately 5 mils. in thickness — said cellulose acetate butyrate layers having integral therewith a light-attenuating dye material is provided. Each exposed surface of cellulose acetate butyrate has slot-coated thereover a layer approximately 3 microns in thickness comprising the polymerization product resultant from coating onto such surface a composition comprising:

| | | |
|---|---|---|
| Acetone | 3340.0 | cc. |
| Methanol | 4400.0 | cc. |
| Methylcellusolve | 240.0 | cc. |
| Nitrocellulose [Hercules RS-4000–5000 sec. nitrocellulose (high molecular)] | 80.0 | gms. |
| duPont Tyzor AA [titanium di (acetyl acetonate)] | 3.1 | gms. |
| Triphenylphosphate | 1.7 | gms. |
| Rohm & Haas U-Formite Mu-56 (melamine formaldehyde resin) | 80.0 | gms., and |
| Maleic Acid | 4.0 | gms. |

The maleic acid is a polymerization catalyst for the melamine formaldehyde resin and the titanium di acetyl acetonate is a crosslinking agent for the nitrocellulose; the triphenylphosphate being present as a plasticizer. The acetone, methanol and methylcellusolve are solvents which evaporate after coating. The polarizer, having a tiecoat-barrier on each side thereof, is then pressed to a spherical configuration of approximately 6 diopters between heated platens, and cut into a circular configuration while simultaneously having projections raised about the periphery thereof and two small holes placed opposed to one another generally along the periphery thereof. The hole-providing functionality and projection raising is generally facilitated by means of a conventional die member which provides such facility commensurate with the cutting operation. The formed light-polarizing element is then placed onto a flange of a cylindrical resilient mold component and an upper glass mold element is placed in contact with the raised projections on the convex surface of the light-polarizing element, the surface configuration of the glass mold element substantially opposed to the surface of the light-polarizing element conforming to the surface configuration of said light-polarizing element. A second glass mold element is placed in abutting relationship to said resilient mold element on the side of said light-polarizing element opposed to the first rigid mold element and the entire unit is clamped together in conventional fashion. About three and one half percent, by weight, of di-s-butyl percarbonate catalyst is added to a predetermined quantity of diethylene glycol bisallyl carbonate monomer, purchased from Pittsburgh Plate Glass Company under the trade designation CR-39, and injected through the resilient mold component into the concave cavity (adjoins concave surface of light-polarizing element) utilizing a suitable syringe. The unit is then placed in an oven for fifteen hours where the temperature is raised from 90° F. to approximately 160° F. in conventional manner. After approximately a 15-hour cure time, the mold is disassembled, and the composite lens is removed and preferably placed in an annealing oven at 200° F. for about 2 hours to relieve any stresses which may have been built up during the forming cycle.

The instant invention contemplates, at the option of the operator, the utilization of conventionl additives which may accelerate, inhibit or otherwise alter the polymerization characteristics of the chosen polymer in order to achieve the desired cure cycle for the lens disclosed herein.

Throughout the specification, the term "ethical" has been used to describe certain ophthalmic lenses. In the context of the present invention, ethical denotes lenses of the nonplanar variety, which are produced according to a given prescription.

Since certain changes may be made in the above product and process without departing from the scope of the invention herein involved, it is intended that all matter contained in the above description or shown in the accompanying drawings shall be interpreted as illustrative and not in a limiting sense.

What is claimed is:

1. A light-polarizing element for employment in a composite lens formed by the in situ polymerization of lens components on each side of said light-polarizing element, said element comprising, a light polarizer having, as a continuous coating on each surface thereof, a layer which enhances adhesion between said light polarizer and subsequently bonded lens components and inhibits migration of constituents of lens components polymerized in contact with the light-polarizing element, during formation thereof, through said layers, said layers consisting essentially of crosslinked nitrocellulose and an additional polymeric constituent which inhibits migration of materials employed in the in situ polymerization of lens elements through said layers during formation of said lens elements in contact with said light-polarizing element.

2. The invention of claim 1 wherein said additional polymeric constituent is a melamine-formaldehyde condensation polymer.

3. The invention of claim 1 wherein the ratio between said nitrocellulose and said melamine-formaldehyde condensation polymer is 1:1, by weight.

4. A synthetic plastic light-polarizing composite ophthalmic lens comprising a light-polarizing element interposed between and bonded to in situ polymerized molded elements comprising an optical quality synthetic plastic material wherein said light-polarizing element comprises a light polarizer having, as a continuous coating on each surface thereof a layer which enhances adhesion between said light polarizer and subsequently bonded lens components and inhibits migration of constituents of lens components polymerized in contact with the light-polarizing element, during formation thereof, through said layers, said layers consisting essentially of crosslinked nitrocellulose and an additional polymeric constituent which inhibits migration of materials employed in the in situ polymerization of lens elements through said layer during formation of said lens elements in contact with said light-polarizing element.

5. The invention of claim 4 wherein said additional polymeric constituent is a melamine-formaldehyde condensation polymer.

6. The invention of claim 5 wherein the ratio between said nitrocellulose and said melamine-formaldehyde condensation polymer is 1:1, by weight.

7. The invention of claim 4 wherein said molded elements comprise polydiethylene glycol bisallyl carbonate.

8. A composite synthetic plastic light-polarizing ophthalmic lens having a concave and a convex surface comprising:
- a light-polarizing element which comprises a transparent sheet of polyvinyl alcohol;
- a thin, uniform support layer comprising cellulose acetate butyrate bonded to each surface of said light-polarizing element;
- a thin coating consisting essentially of crosslinked cellulose nitrate and a melamine-formaldehyde condensation polymer on each cellulose acetate butyrate surface opposed to said light-polarizing element; and
- a molded lens element comprising polydiethylene glycol bisallyl carbonate adhered to each of said coatings consisting essentially of cellulose nitrate and a melamine-formaldehyde condensation polymer.

9. The invention of claim 8 wherein said coatings consisting essentially of cellulose nitrate and a melamine-formaldehyde condensation polymer are from 2 to 20 microns in thickness.

* * * * *